US010702899B2

(12) United States Patent
Daniel et al.

(10) Patent No.: US 10,702,899 B2
(45) Date of Patent: Jul. 7, 2020

(54) CONTAINER FEEDING AND CLEANING APPARATUS

(71) Applicant: American Canning Machines, LLC, Austin, TX (US)

(72) Inventors: Michael T. Daniel, Austin, TX (US); Donna Daniel, Austin, TX (US); David Racino, Austin, TX (US); Nicholas Mazzanti, Austin, TX (US)

(73) Assignee: American Canning Machines, LLC, Austin, TX (US)

( * ) Notice: Subject to any disclaimer, the term of this patent is extended or adjusted under 35 U.S.C. 154(b) by 34 days.

(21) Appl. No.: 15/948,017

(22) Filed: Apr. 9, 2018

(65) Prior Publication Data

US 2018/0290187 A1    Oct. 11, 2018

Related U.S. Application Data

(60) Provisional application No. 62/483,421, filed on Apr. 9, 2017.

(51) Int. Cl.
| | | |
|---|---|---|
| *B08B 9/30* | (2006.01) | |
| *B08B 9/34* | (2006.01) | |
| *B08B 9/42* | (2006.01) | |
| *B08B 9/28* | (2006.01) | |
| *B65G 47/26* | (2006.01) | |
| *B08B 3/02* | (2006.01) | |

(52) U.S. Cl.
CPC ............... *B08B 9/30* (2013.01); *B08B 9/28* (2013.01); *B08B 9/34* (2013.01); *B08B 9/423* (2013.01); *B08B 3/02* (2013.01); *B65G 47/268* (2013.01)

(58) Field of Classification Search
CPC ..... B08B 9/30; B08B 9/28; B08B 9/34; B08B 9/423; B08B 3/02; B65G 47/268
USPC ............................................ 134/142
See application file for complete search history.

(56) References Cited

U.S. PATENT DOCUMENTS

| | | | |
|---|---|---|---|
| 4,559,961 A | 12/1985 | Anderson et al. | |
| 4,836,228 A | 6/1989 | Julius | |
| 5,441,063 A * | 8/1995 | Fernandez | ............... B08B 9/32 |
| | | | 134/142 |
| 9,199,286 B2 | 12/2015 | Jendrichowski et al. | |
| 9,731,845 B2 | 8/2017 | Petrini | |

* cited by examiner

*Primary Examiner* — Tinsae B Ayalew
(74) *Attorney, Agent, or Firm* — Kowert, Hood, Munyon, Rankin & Goetzel, P.C.; Gareth M. Sampson (57) ABSTRACT

An apparatus and associated methods are disclosed for washing a plurality of beverage containers. The apparatus may include an enclosure, a holder positioned in the enclosure, a receptacle for a beverage container in the holder, and an injector coupled to the enclosure. The holder may rotate in the enclosure about an axis of rotation. As the holder rotates, the receptacle may move (e.g., rotate) through a plurality of positions about the axis of rotation. The receptacle may be positioned to receive a beverage container in a first position about the axis of rotation. When rotated to a second position about the axis of rotation, the receptacle may be aligned with the injector and the injector may provide a fluid inside the beverage container in the receptacle. The receptacle may be positioned to drain the fluid from the beverage container in the receptacle in the second position or after being rotated to a third position.

20 Claims, 13 Drawing Sheets

CONTAINER FEEDING AND CLEANING APPARATUS

PRIORITY CLAIM

This patent claims priority to U.S. Provisional Patent Application No. 62/483,421 to Daniel et al., entitled "Container Cleaning and Feeding Mechanism", filed Apr. 9, 2017, which is incorporated by reference in its entirety.

BACKGROUND

1. Field of the Invention

Embodiments disclosed herein relate to cleansing of containers in preparation to filling with commodities or materials. Certain embodiments disclosed herein relate to an apparatus for cleaning cans in preparation for filling the cans with liquids.

2. Description of the Relevant Art

As containers (e.g., beverage containers such as aluminum cans, glass bottles, plastic bottles or cans, etc.) are often used in the food and beverage industry, there continues to be developments in processing techniques for handling containers. In particular, there is a growing need for automation of container handling tasks, in both small footprint and large footprint environments. Automation and simplification of container handling tasks may increase productivity and/or reduce costs associated with packaging food or beverages in containers.

A common technique currently used for cleaning beverage containers (e.g., cans used to contain beverages such as, but not limited to, beer cans) is the use of a twist rinser. Twist rinsers may, however, have very large footprints and be a relatively expensive capital cost. Thus, for certain applications (e.g., smaller space warehouses or factories), there remains a need for container (e.g., beer can) cleaning apparatus that have relatively good throughput in smaller footprints, and potentially lower capital costs for small and/or independent businesses.

SUMMARY

In certain embodiments, an apparatus for washing a plurality of beverage containers includes an enclosure and a holder positioned in the enclosure. The holder may include at least one receptacle for a beverage container. The holder may be rotatable in the enclosure about an axis of rotation such that the at least one receptacle moves through a plurality of positions about the axis of rotation. An injector may be coupled to the enclosure. In a first position about the axis of rotation, the at least one receptacle may be positioned to receive a beverage container in the at least one receptacle. In a second position about the axis of rotation, the at least one receptacle may be aligned with the injector and the injector may be configured to provide a fluid inside of the beverage container in the at least one receptacle. The at least one receptacle may be positioned to drain the fluid from the beverage container in the at least one receptacle in a third position about the axis of rotation. In some embodiments, the second and third positions about the axis of rotation (e.g., the injector and drain positions) are the same positions about the axis of rotation.

In certain embodiments, a method for washing one or more beverage containers includes moving a beverage container into a receptacle in a beverage container holder. The holder may be positioned in an enclosure. The receptacle may be in a first position about an axis of rotation of the holder in the enclosure when the beverage container is moved into the receptacle. The holder may be rotated in the enclosure about an axis of rotation to rotate the receptacle and the beverage container to a second position about the axis of rotation. A fluid may be provided inside of the beverage container using an injector coupled to the enclosure at the second position about the axis of rotation. Fluid inside the beverage container may drain from the beverage container in the second position about the axis of rotation or after being rotated to a third position about the axis of rotation. The holder in the enclosure may be rotated about the axis of rotation to rotate the receptacle and the beverage container to the first position about the axis of rotation and the beverage container may be moved out of the receptacle.

BRIEF DESCRIPTION OF THE DRAWINGS

Features and advantages of the methods and apparatus described herein will be more fully appreciated by reference to the following detailed description of presently preferred but nonetheless illustrative embodiments when taken in conjunction with the accompanying drawings in which.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The scope of the present disclosure includes any feature or combination of features disclosed herein (either explicitly or implicitly), or any generalization thereof, if it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

The following examples are included to demonstrate preferred embodiments. It should be appreciated by those of skill in the art that the techniques disclosed in the examples which follow represent techniques discovered by the inventor to function well in the practice of the disclosed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosed embodiments.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Figure 1:
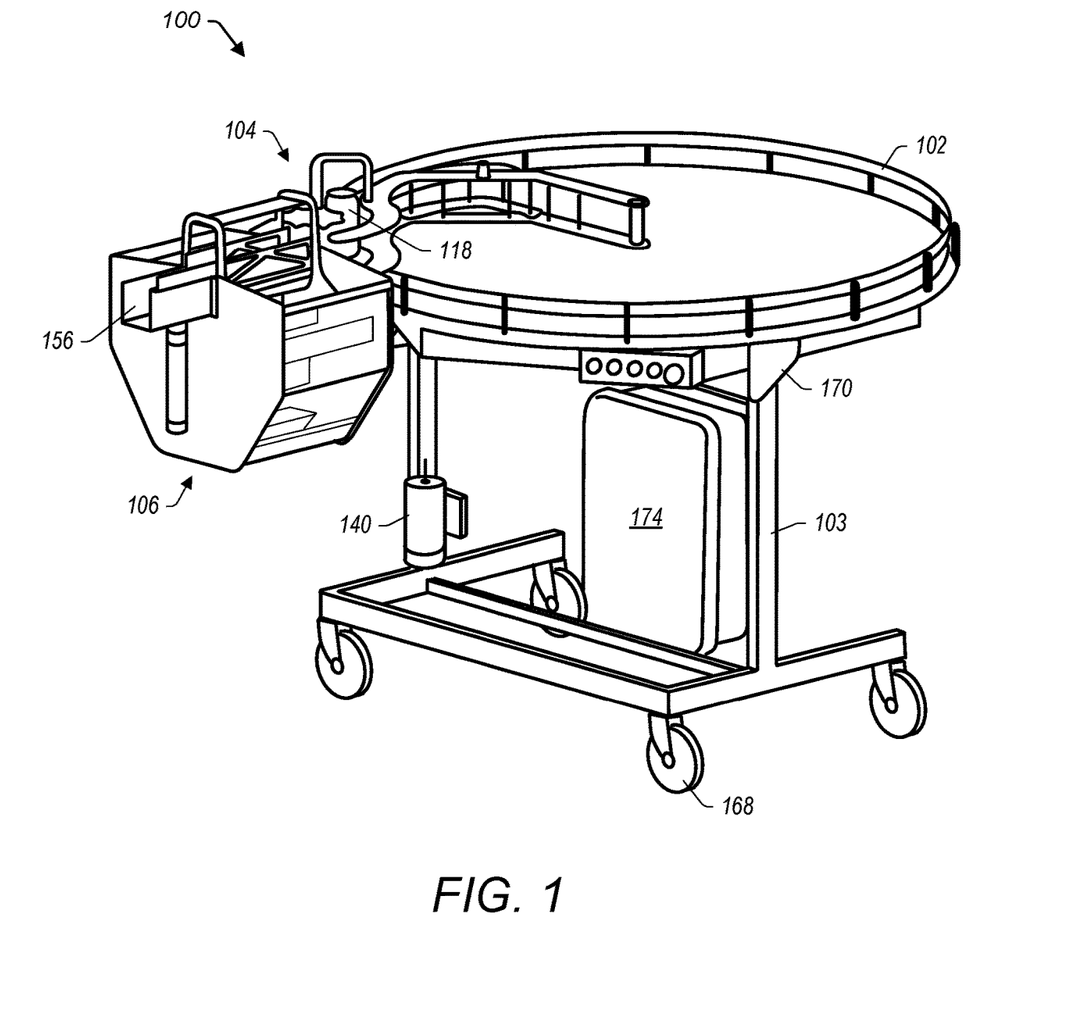
FIG. 1 depicts a perspective view of an embodiment of a container washing apparatus.
Figure 2:
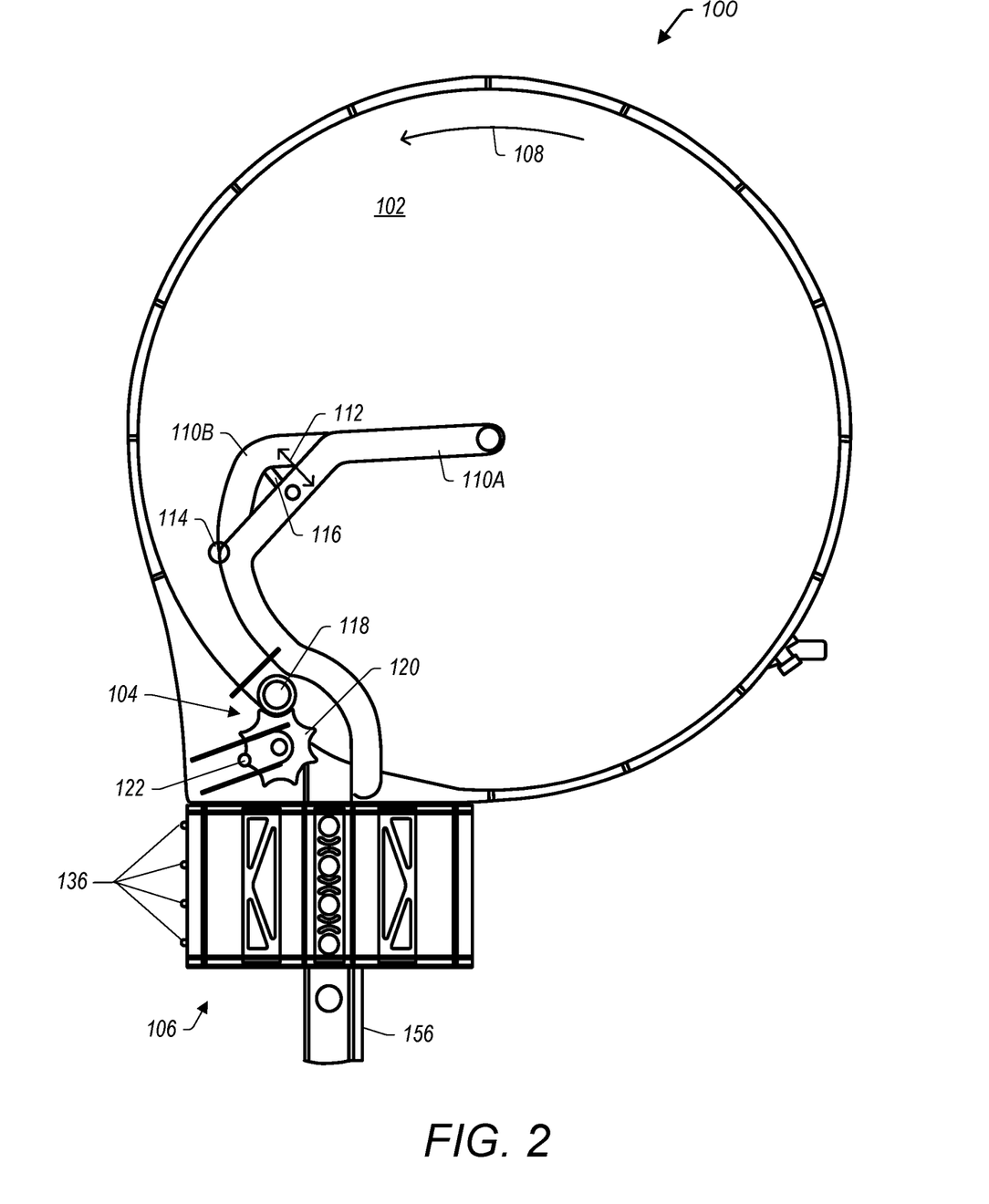
FIG. 2 depicts a top view of an embodiment of a container washing apparatus.

FIG. 1 depicts a perspective view of an embodiment of container washing apparatus 100. FIG. 2 depicts a top view of an embodiment of container washing apparatus 100. In certain embodiments, apparatus 100 is used to wash (e.g., rinse) cans (e.g., aluminum or steel cans). Apparatus 100 may be used, for example, to wash and rinse the inside of cans before the cans are filled with liquids (such as beer or soda), or other food materials, to be packaged in the cans. Apparatus 100 may be designed to operate with containers of varying sizes. For example, apparatus 100 may be adjusted to operate with 12-oz. cans, 16-oz. cans, or 24-oz. cans. Adjustment of apparatus 100 to accommodate different sizes of cans may be accomplished with adjustable settings (e.g., height adjustments) on the apparatus. In some embodiments, apparatus 100 may be used to wash other types of containers or beverage containers. For example, apparatus 100 may be designed to wash bottles.

In certain embodiments, as shown FIGS. 1 and 2, apparatus includes accumulation table 102, mover system 104, and washing system 106. Accumulation table 102 may be, for example, a holding area or queue area for containers (e.g., cans). In certain embodiments, accumulation table 102 is mounted (or otherwise attached) to frame 103. Frame 103 may be a structure designed to support accumulation table 102, mover system 104, and washing system 106 as well as other components needed for operation of apparatus 100 (e.g., pumps, controllers, reservoirs, etc.).

Containers may be placed on accumulation table 102 before the containers are moved by mover system 104 into washing system 106. In certain embodiments, as shown FIGS. 1 and 2, accumulation table 102 is a rotary table. Accumulation table 102 may, however, be any type of accumulation table known in the art. For example, accumulation table 102 may be a conveyor accumulation table, a gravity-fed accumulation table, a spiral feed accumulation table. In some embodiments, accumulation table 102 may include a tube or chute for guiding containers.

Figure 3:
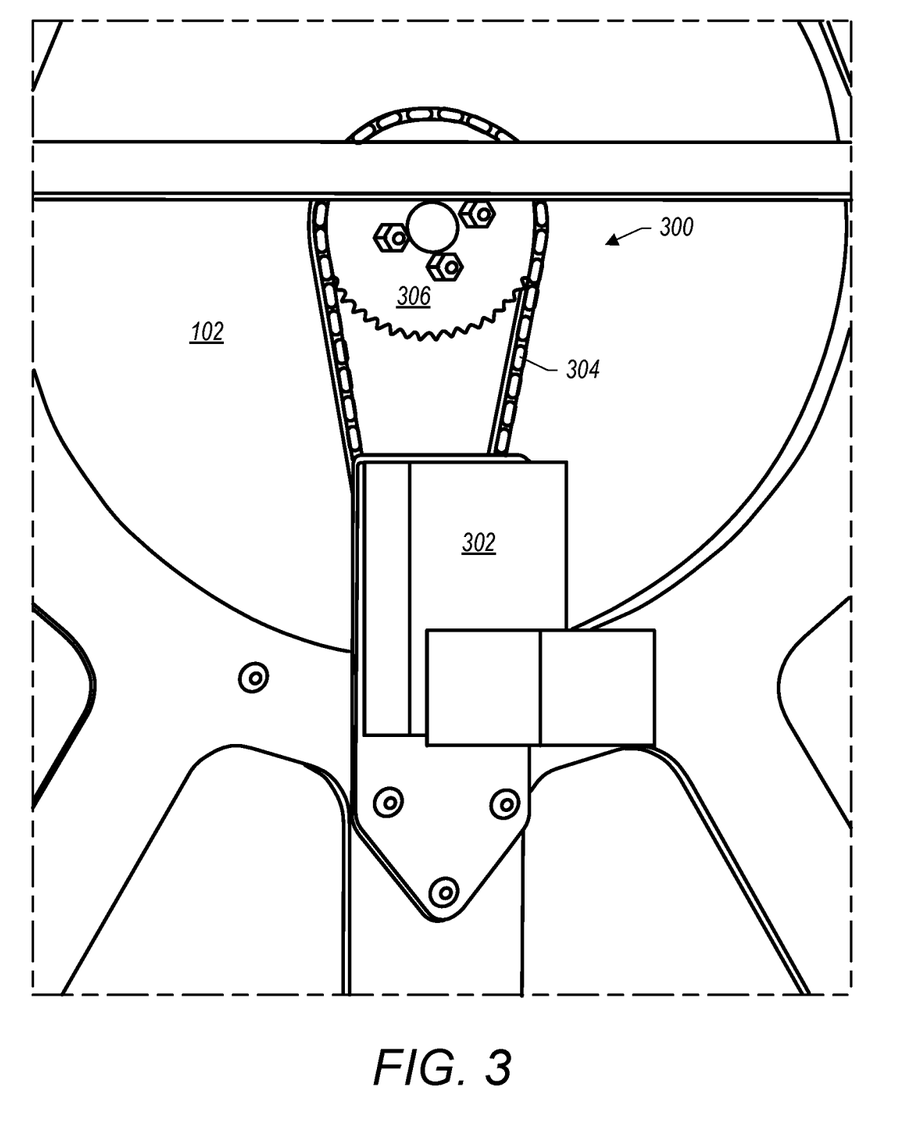
FIG. 3 depicts a perspective view of an embodiment of a drive system for an accumulation table.

In certain embodiments, accumulation table 102 moves and feeds containers into mover system 104. As shown in FIG. 2, accumulation table 102 may rotate (shown by arrow 108) in a counter-clockwise direction. FIG. 3 depicts a perspective view of an embodiment of drive system 300 for accumulation table 102. In certain embodiments, drive system 300 includes motor 302, sprocket 304, and chain 306. Sprocket 304 may be attached to accumulation table 102. Motor 302 may drive chain 306 to rotate sprocket 304, thus rotating accumulation table 102.

Figure 4:
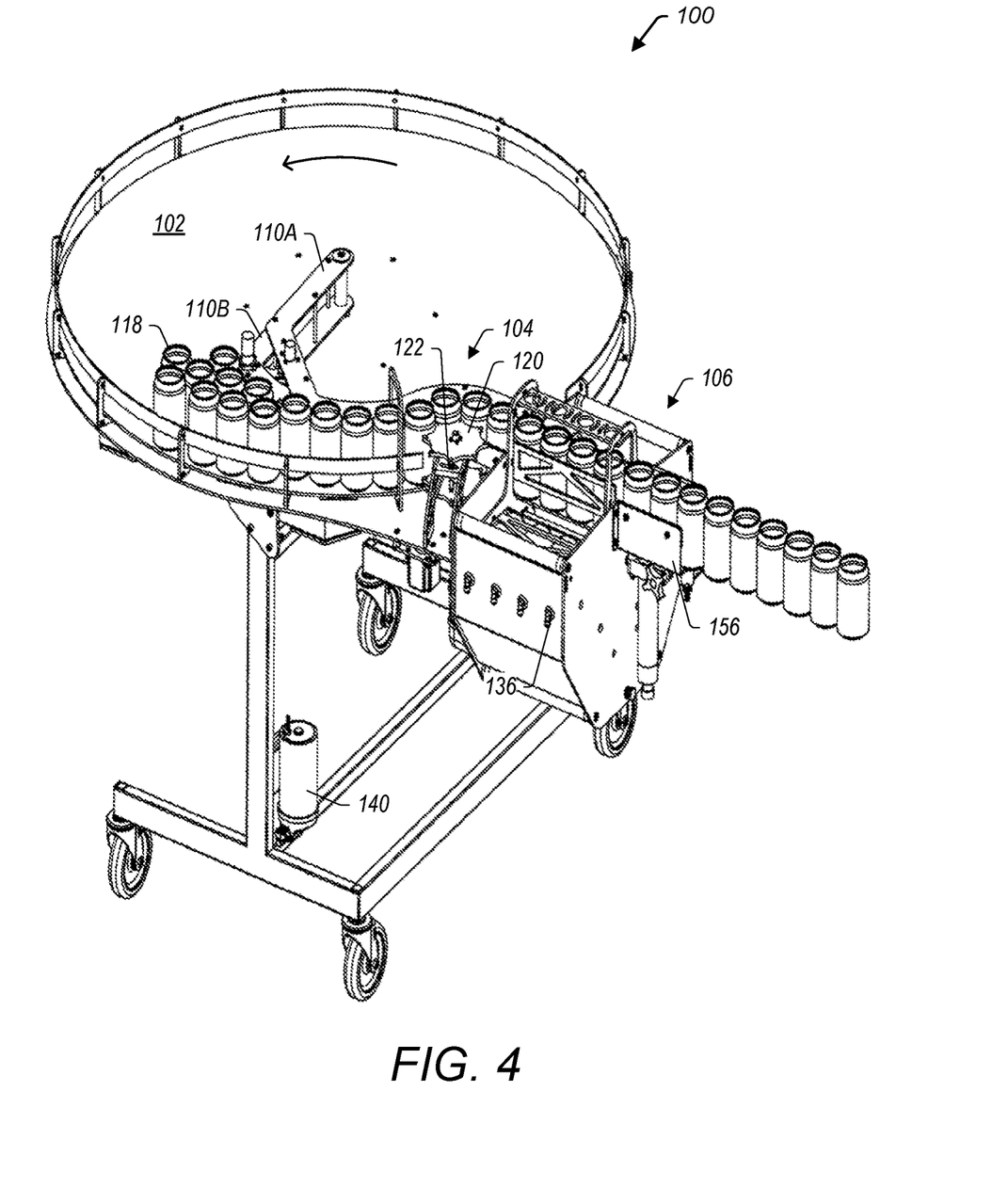
FIG. 4 depicts a perspective view of an embodiment of a container washing apparatus with containers moving through the apparatus.

FIG. 4 depicts a perspective view of an embodiment of apparatus 100 with containers 118 moving through the apparatus. The counter-clockwise rotation of accumulation table 102 may move containers 118 towards oscillator 110. As shown in FIGS. 2 and 4, oscillator 110 may include fixed portion 110A and movable portion 110B. Movable portion 110B may be moveable back and forth in the direction of arrow 112 using actuator 116. For example, as shown in FIG. 2, movable portion 110B may pivot back and forth around pivot point 114 and relative to the direction of incoming containers (e.g., upwards in FIG. 2). Actuator 116 may be used to oscillate or vary the movement of movable portion 110B to help transition containers 118 into the single file row. Oscillation of movable portion 110B may help inhibit clogs, jams, or choke points through the continuous or periodic changing of the arrangement of containers 118 against oscillator 110. Actuator 116 may include, for example, providing movement using belt driven, spring driven, vibration, or air bursts to move movable portion 110B.

As shown in FIG. 4, oscillator 110 may organize containers 118 into a single row as the containers are moved past oscillator 110 and into mover system 104 by the rotation of accumulation table 102. The spring-controlled, counteracting force of movable portion 110B may control (e.g., guide) the movement of containers 118 from a container bunch (e.g., containers bunched together in multiple rows) into the single row of containers that move through mover system 104.

Figure 5:
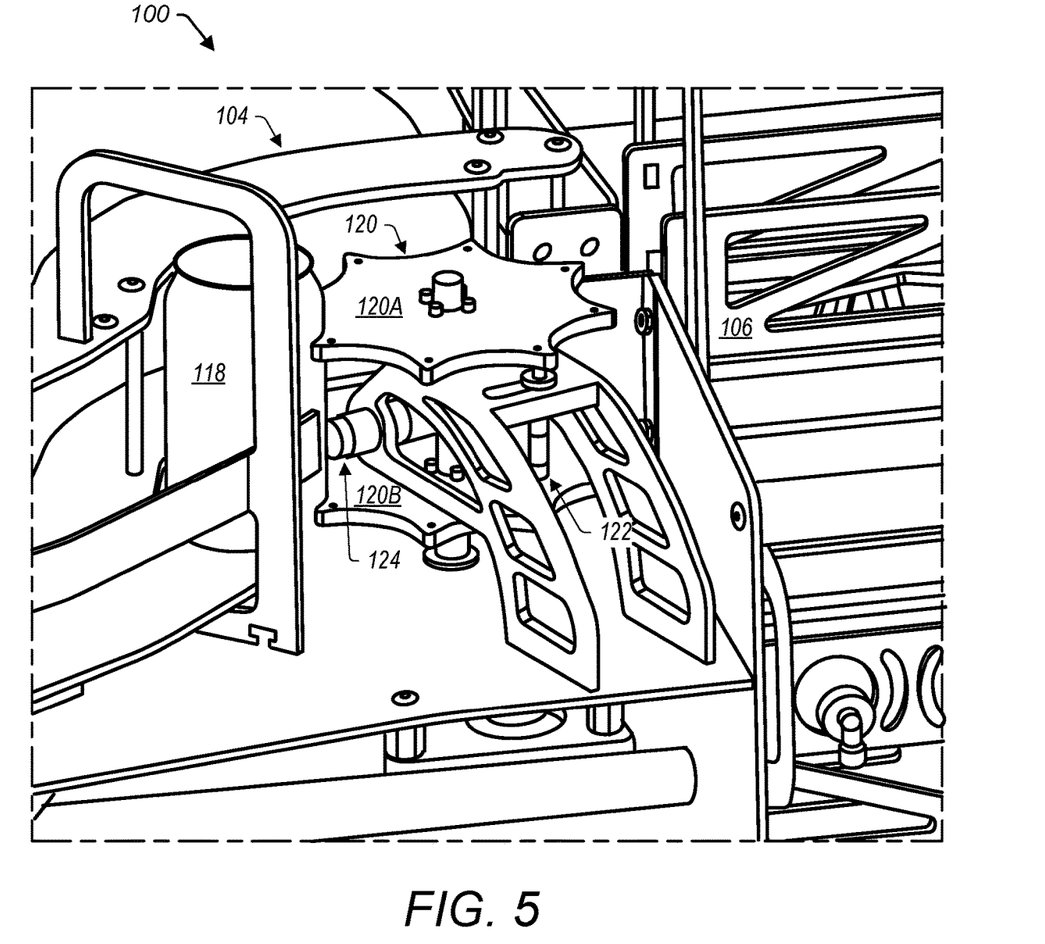
FIG. 5 depicts an enlarged perspective view of an embodiment of a container washing apparatus showing a mover system.

FIG. 5 depicts an enlarged perspective view of an embodiment of apparatus 100 showing mover system 104. In certain embodiments, mover system 104, includes actuator 120 and actuator position sensor 122. In some embodiments, actuator 120 includes upper actuator portion 120A and lower actuator portion 120B. Upper actuator portion 120A and lower actuator portion 120B may be coupled together and move as a single unit. Upper actuator portion 120A and lower actuator portion 120B engage both upper and lower parts of container 118 to prevent tipping of the container when the container is engaged by actuator 120.

Actuator 120 may be a rotary actuator or wheel actuator. In certain embodiments, actuator 120 is a star wheel actuator. The star wheel actuator 120 may include, as shown in FIG. 5, curved depressions between points of the star. The curved depressions may in actuator 120 may be sized to engage and move containers 118 through mover system 104. In some embodiments, actuator 120 may be another type of actuator such as, but not limited to, a feed screw, a drive belt, a conveyor belt, or a linear actuator.

Actuator position sensor 122 may be used to assess a position of actuator 120. Assessment of the position of actuator 120 may be used to control operation of mover system 104 and apparatus 100. For example, actuator position sensor 122 may be used to count a number of containers 118 moving through mover system 104 based on the position of actuator 120. Counting the number of containers 118 may be used to control container washing operations in washing system 106, as described herein. For example, washing of containers 118 in washing system 106 may be activated once a selected number of containers are counted using actuator position sensor 122. In some embodiments, actuator position sensor 122 is used to detect an error in the position of actuator 120.

In certain embodiments, mover system 104 includes container presence sensor 124. Container presence sensor 124 may be used to detect the presence of container 118 and control operation of mover system 104 and apparatus 100. For example, apparatus 100 may be stopped or slowed down if container presence sensor 124 does not detect a container (e.g., mover system 104 is empty of containers). The lack of presence of a container detected by container presence sensor 124 may be an indication of an error on accumulation table 102 or additional containers needing to be added to the accumulation table.

Figure 6:
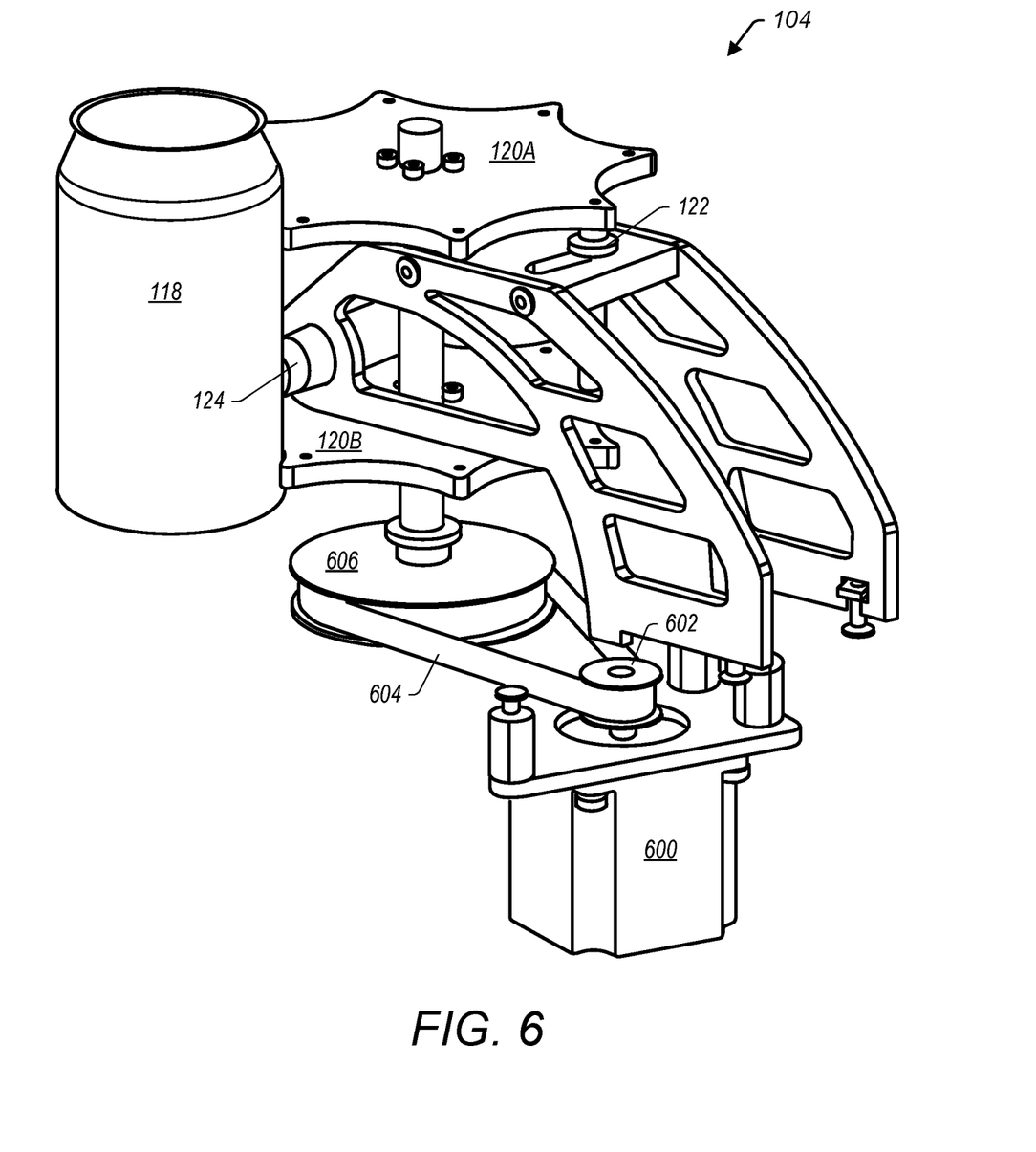
FIG. 6 depicts an isolated perspective view of an embodiment of a mover system.

FIG. 6 depicts an isolated perspective view of an embodiment of mover system 104. In certain embodiments, actuator 120 is operated using a pulley system coupled to a motor. Motor 600 may be coupled to motor pulley 602. Belt 604 may couple motor pulley 602 to actuator pulley 606. Thus, rotation of motor pulley 602 by motor 600 may rotate actuator pulley 606. Rotation of actuator pulley 606 may then rotate actuator 120.

As shown in FIGS. 1, 2, and 4, mover system 104 may move containers 118 into washing system 106. While containers 118 are positioned in washing system 106, the containers may be washed and/or rinsed (e.g., cleaned) as desired. In certain embodiments, washing system 106 is capable of cleaning multiple containers substantially simultaneously (e.g., in unison). For example, as shown in FIGS. 1, 2, and 4, washing system 106 is capable of processing four containers 118 in unison (side-by-side) through the washing system (e.g., washing system 106 has parallel holding positions for four containers at a time). Washing system 106 may, however, be designed for processing any number of containers 118 substantially simultaneously or in unison.

Figure 7:
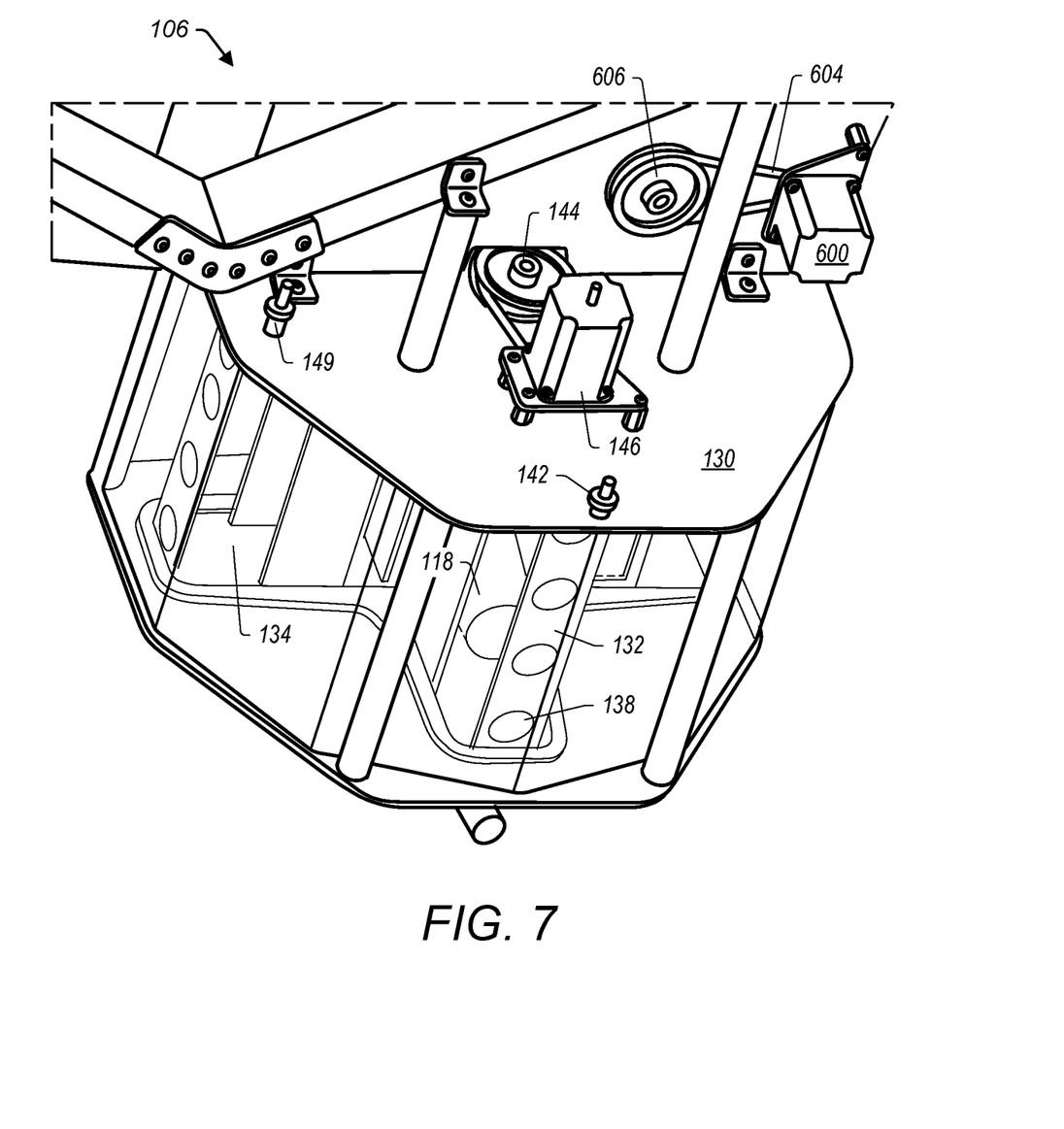
FIG. 7 depicts a bottom perspective view of an embodiment of a washing system.

FIG. 7 depicts a bottom perspective view of an embodiment of washing system 106. FIGS. 8-11 depict cross-sectional side views of the embodiment of washing system 106 in FIG. 7 with container 118 passing through multiple positions. It is to be understood that while a single container 118 is shown in the cross-sectional side views of FIGS. 8-11, such embodiments are understood to be capable of processing multiple containers positioned side-by-side in washing system 106 (e.g., additional containers would be positioned into or out of the page). For example, as shown in FIG. 7, washing system 106 includes 4 side-by-side positions for containers 118 to move through the positions depicted in FIGS. 8-11.

Figure 8:
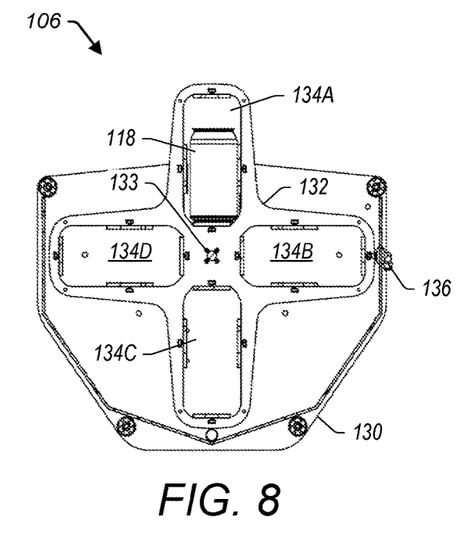
FIG. 8 depicts a cross-sectional side view of the embodiment of the washing system in FIG. 7 with a container in a first position.

FIG. 8 depicts a cross-sectional side view of the embodiment of washing system 106 in FIG. 7 with container 118 in a first position. In certain embodiments, the first position, shown in FIG. 8, is the position that container 118 enters washing system 106 from mover system 104 (e.g., the start position for the container in the washing system). The first position may also be the position that container 118 exits washing system 106 after being processed in the washing system (e.g., the finish position for the container in the washing system).

In certain embodiments, as shown in FIGS. 7-11, washing system 106 includes enclosure 130 and holder 132. Enclosure 130 may be a frame, a box, a shell, a chassis, or another mechanical body or structure designed to support and/or at least partially enclose one or more components. Holder 132 may be a body designed to receive containers 118 from mover system 104 and then hold and move the containers through various positions inside enclosure 130. In certain embodiments, holder 132 is a body or framework capable of rotating about axis 133 (e.g., axis 133 is the axis of rotation for the holder). In some embodiments, holder 132 may be termed a "flip cage" (e.g., a body or framework for holding containers that is capable of flipping/rotating the containers).

In certain embodiments, holder 132 includes container receptacles 134. Container receptacles 134 may be spaces or objects in holder 132 designed with a shape to receive container 118 from mover system 104 and hold the container while the holder moves or rotates. Container receptacles 132 may include additional components or structures that hold containers 118 in place while in the receptacles. For example, container receptacles 132 may include pins, notches, or springs that operate to position and hold containers 118 in the receptacles.

Figure 10:
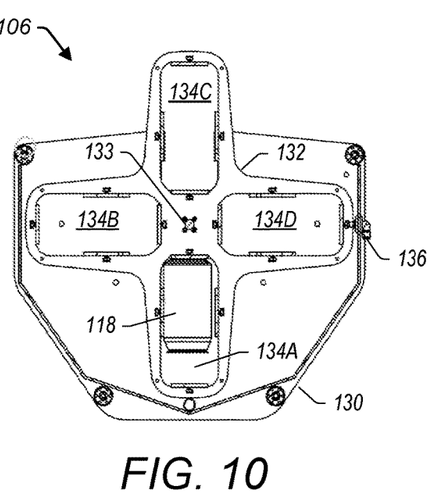
FIG. 10 depict cross-sectional side views of the embodiment of the washing system in FIG. 7 with a container in a third position.
Figure 11:
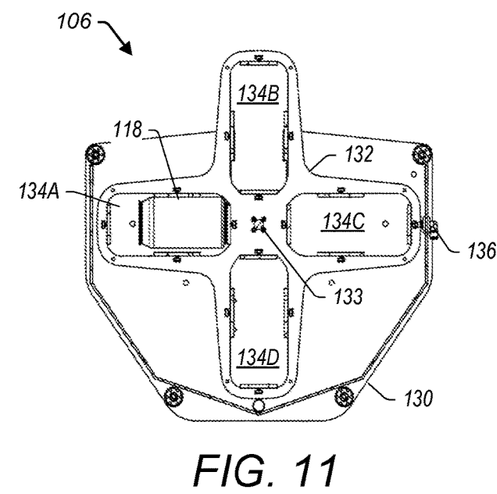
FIG. 11 depict cross-sectional side views of the embodiment of the washing system in FIG. 7 with a container in a fourth position.
Figure 12:
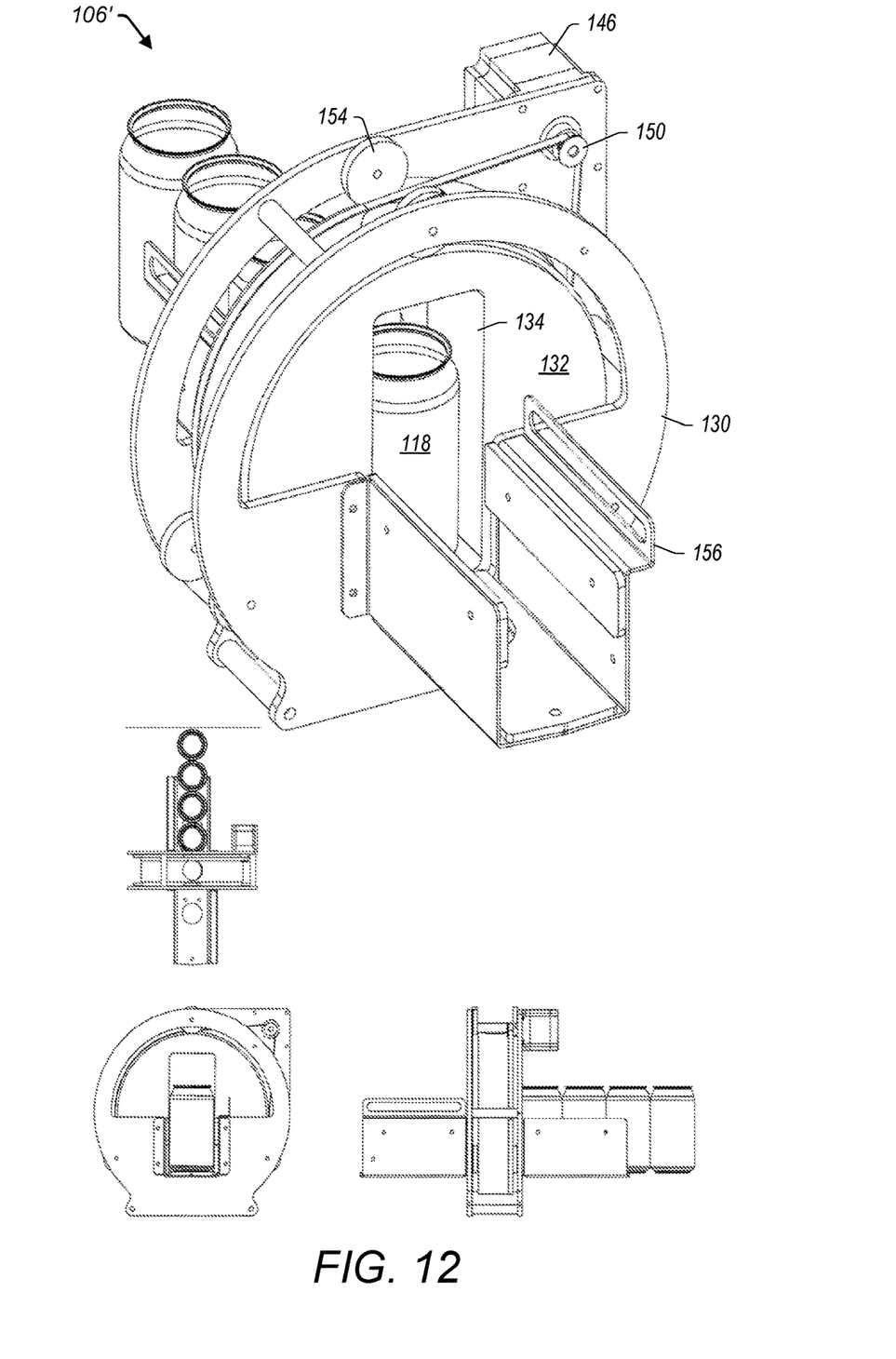
FIG. 12 depicts a perspective view of an embodiment of a washing system with one container receptacle in a holder.

In one embodiment, as shown in FIGS. 8-11, holder 132 includes four container receptacles 134A-D, where the container holding positions are rotationally offset from each other (e.g., rotated about 90° from each other). While FIGS. 8-11 depict a single container 118 positioned in container receptacle 134A, it is to be understood that two or more containers may be simultaneously positioned in any of container receptacles 134A-D as desired. For example, four containers 118 may be positioned in holder 132 with one container in each of container receptacles 134A-D to provide maximum throughput of containers through washing system 106. It should also be understood that the number of container receptacles 134 in holder 132 and/or the rotational offset between receptacles may be varied as desired. For example, FIG. 12 depicts a perspective view of an embodiment of washing system 106' with one container receptacle 134 in holder 132.

Figure 9:
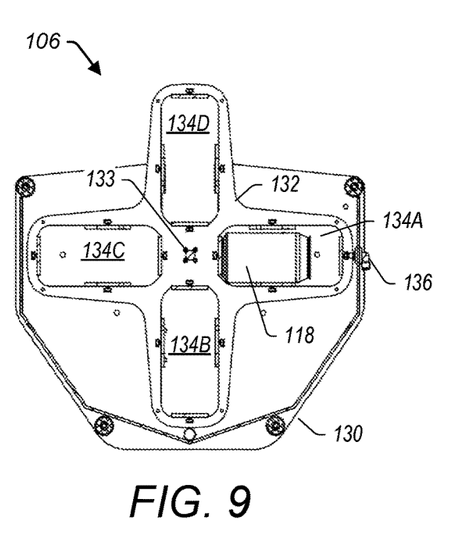
FIG. 9 depict cross-sectional side views of the embodiment of the washing system in FIG. 7 with a container in a second position.

After container 118 enters washing system 106 in the first position shown in FIG. 8 (e.g., the container is in container receptacle 134A and in the first/start position), holder 132 may rotate the container to a second position. FIG. 9 depicts a cross-sectional side view of the embodiment of washing system 106 in FIG. 7 with container 118 in the second position. In certain embodiments, the second position is a "washing position" in washing system 106. For example, the inside of container 118 may be washed or rinsed while in the second position.

In certain embodiments, injector 136 is used to wash the inside of container 118. Injector 136 may include any device capable of directing a fluid or other medium towards and/or into container 118. Injector 136 may be, for example, a spray nozzle or another type of nozzle. Fluids or mediums provided by injector 136 for washing containers 118 may include, but not be limited to, water, sanitizer, cleaning liquids, detergents, gas. Injector 136 may also include, or be able to provide light (e.g., UV light) into containers 118. Fluids or mediums may be provided to injector 136 from pump 140 (shown in FIGS. 1 and 4). Pump 140 may be coupled to a reservoir or other source that provides the fluids or mediums for injector 136. In some embodiments, holder 132 includes opening 138 (shown in FIG. 7) to allow fluids from injector 136 to be directed into container 118.

After container 118 is washed in the second position shown in FIG. 9, holder 132 may rotate the container to a third position. FIG. 10 depicts a cross-sectional side view of the embodiment of washing system 106 in FIG. 7 with container 118 in the third position. In certain embodiments, the third position is a "drain" position. In the third position, container 118 may drain or dry out. In some embodiments, container 118 is held upside down (with opening pointed downwards) to allow gravity drainage of fluids from the container. In some embodiments, washing system 106 includes an additional injector (or other device) for providing air or other gas to dry out container 118. Fluids drained or otherwise moved out of container 118 may drain out of enclosure 130 through drain hole 142. In some embodiments, drain hole 142 is coupled to an external drain source (such as a sewer drain line or fluid recycling system).

In certain embodiments, after container 118 is drained in the third position shown in FIG. 10, holder 132 may rotate the container to a fourth position. FIG. 11 depicts a cross-sectional side view of the embodiment of washing system 106 in FIG. 7 with container 118 in the fourth position. The fourth position may be a waiting or "queue" position for container 118. For example, in the fourth position, container 118 may wait to be moved back to the first position (e.g., the finish position, as shown in FIG. 8), where the container will then be moved out of washing system 106 when a new "dirty" container moves into the washing system.

It is to be understood washing system 106 is not limited to the first through fourth positions in the embodiments depicted in FIGS. 8-11. As such, the number of positions for container 118 through the washing/draining process may vary as needed or desired. For example, the third and fourth positions (the "drain" and "queue" positions) may be combined into a single position. As another example, washing system 106 may include two positions—the entry/exit position from holder 132 for container 118 and a combined wash/drain position for the container (e.g., the container may be turned upside down and both washed and drained in the upside down position).

It is also to be understood that containers 118 may be continuously processed through washing system 106. For example, as holder 132 rotates and receptacles 134 move into the first position, processed containers 118 may be moved out of washing system from the receptacles in the first position by the movement of new "dirty" containers into the receptacles in the first position (e.g., the force of the new "dirty" containers pushes the clean containers out of the washing system and onto bridge 156 (described below)). Thus, with containers 118 occupying each of the receptacles 134 at any given time during processing except for the small period of time between moving containers into and out of the receptacles in the first position, containers are substantially continuously occupying receptacles holder 132 during processing.

In certain embodiments, as shown in FIG. 7, holder 132 is rotated using pulley 144 coupled to motor 146 be belt 148. Pulley 144 may be positioned at the axis of rotation of holder 132 (e.g., axis 133 depicted in FIGS. 8-11. In certain embodiments, washing system 106 includes position sensor 149. Position sensor 149 may be used to assess a position of holder 132 inside enclosure 130. In some embodiments, position sensor 149 is used to detect an error in the position of holder 132.

Figure 13:
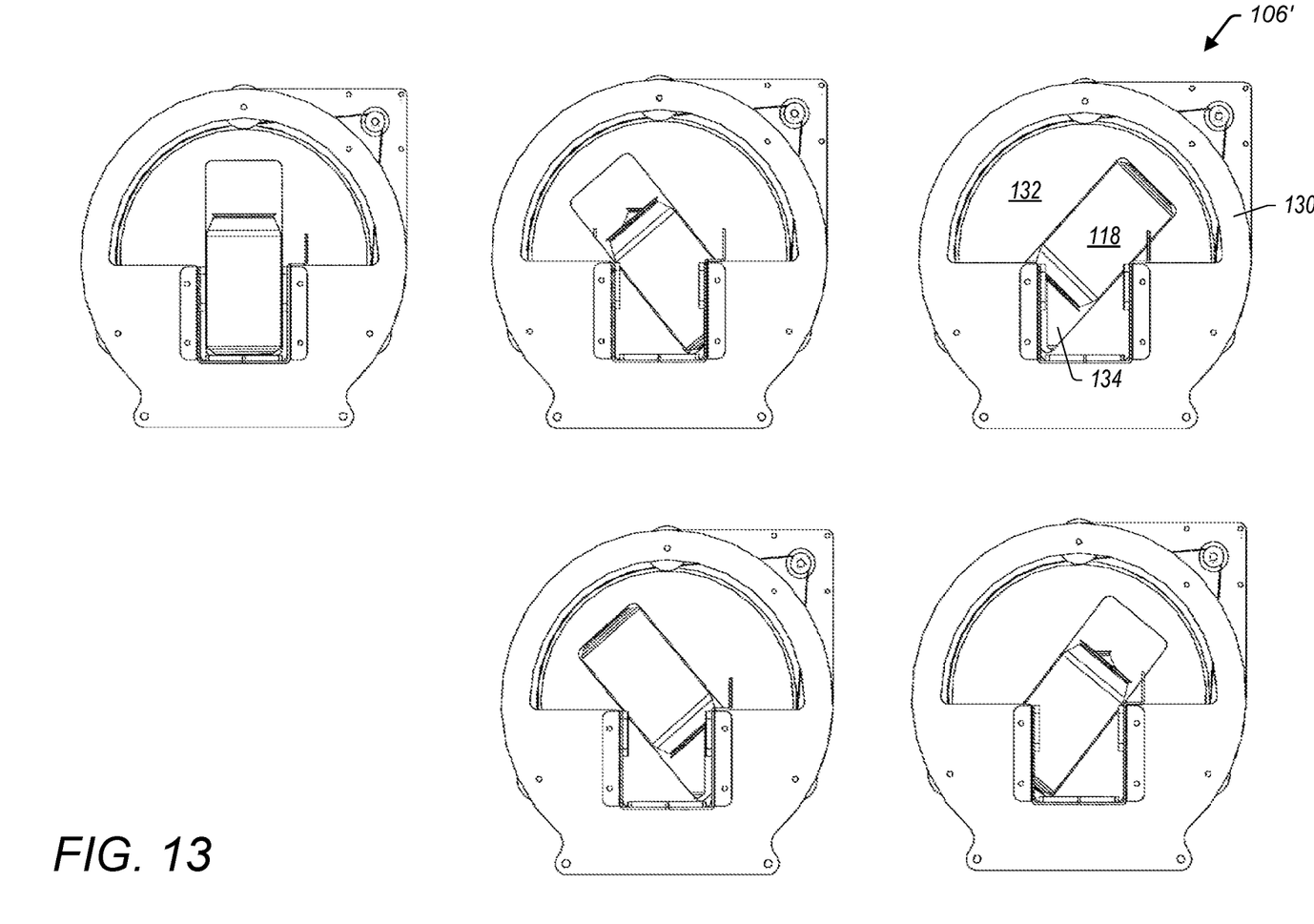
FIG. 13 depicts cross-sectional side views of examples of rotation of a holder (and a container) for the embodiment of a washing system depicted in FIG. 12.

Rotation of holder 132 may, however, not be limited to the configuration shown in FIG. 7. For example, holder 132 may be rotated with motor 146 coupled to pulley 150 and belt 152, which drive rotation of the holder, as shown in FIG. 12. Bearings 154 may be positioned to guide rotation of holder 132. FIG. 13 depicts cross-sectional side views of examples of rotation of holder 132 (and container 118) for the embodiment of washing system 106' depicted in FIG.

Once containers 118 are processed in washing system 106 and moved back to the "start/finish" position (e.g., the first position) depicted in FIG. 8, the containers may be moved out of the washing system. In certain embodiments, containers 118 are moved onto bridge 156, shown in FIGS. 1, 2, and 4. Bridge 156 may couple apparatus 100 to a downstream apparatus. The downstream apparatus may be, for example, a filling apparatus that fills containers 118 with liquids or other food materials to be packaged in the containers.

Figure 14:
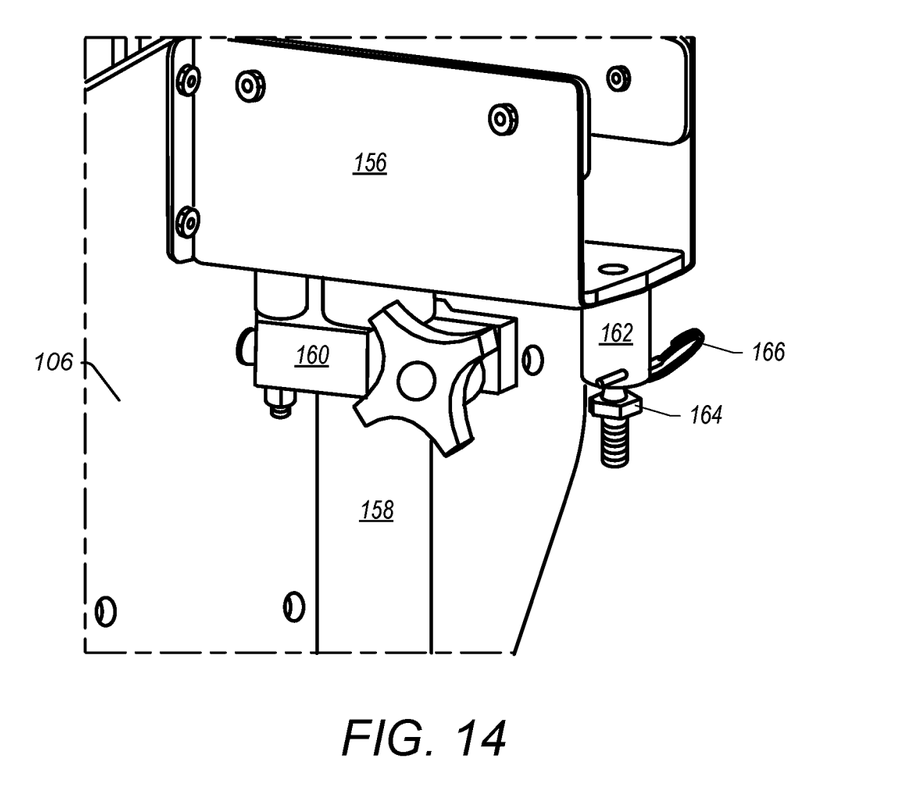
FIG. 14 depicts an enlarged perspective view of an embodiment of a bridge coupled to a washing system.

FIG. 14 depicts an enlarged perspective view of an embodiment of bridge 156 coupled to washing system 106. In some embodiments, print head 158 is coupled to bridge 156 using mount 160. Print head 158 may be used, for example, to print (e.g., mark) identification, dates, or other markings on containers 118. Print head 158 may be, for example, an inkjet print head or a laser print head. In some embodiments, hitch mount 162 is coupled to bridge 156. Hitch mount 162 may be coupled to ball mount 164 using hitch pin 166. Hitch mount 162 and ball mount 164 may be used to couple apparatus 100 to a filling apparatus or other downstream apparatus.

In some embodiments, as shown in FIG. 1, apparatus 100 includes casters 168 coupled to the bottom of frame 103. Casters 168 may be wheels or other devices that allow apparatus 100 to be readily moved when needed. In some embodiments, casters 168 are locking casters. For example, casters 168 may lock in place, when desired, to inhibit unwanted movement of apparatus 100.

Figure 15:
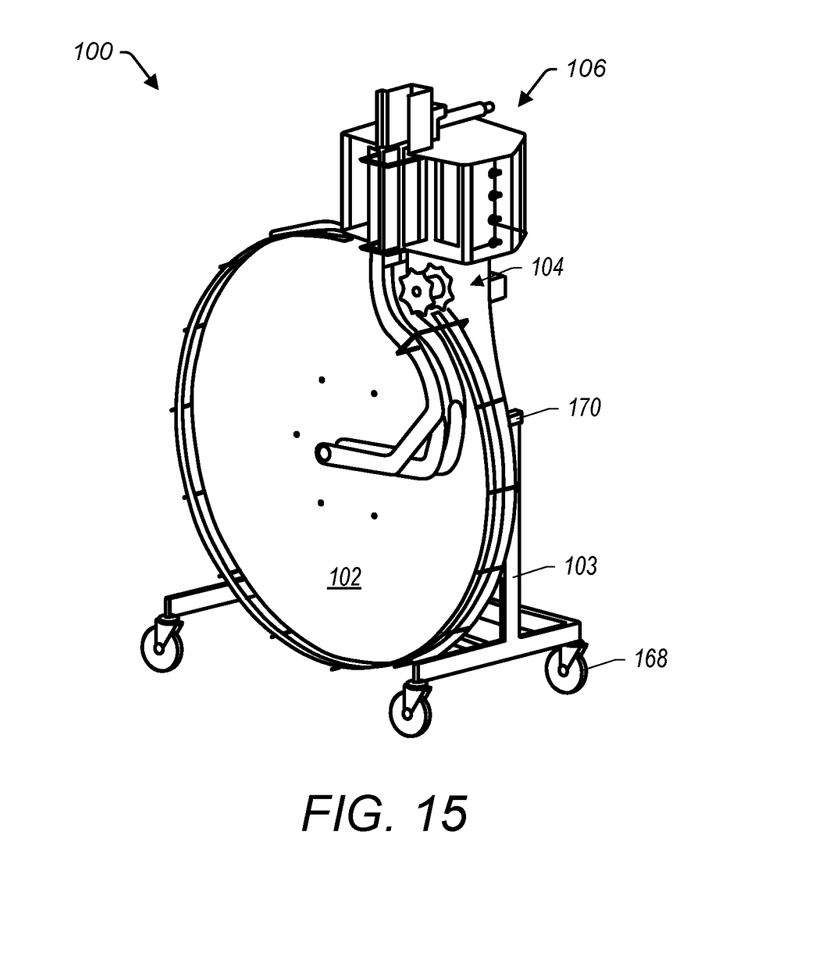
FIG. 15 depicts a perspective view of an embodiment of a container washing apparatus in a compact state.

In some embodiments, apparatus 100 is capable of being compacted for storage and/or transportation of the apparatus. For example, FIG. 15 depicts a perspective view of an embodiment of apparatus 100 in a compact state. Apparatus 100 may include, for example, brackets 170 on the coupling between accumulation table 102 and frame 103, shown in both FIG. 1 and FIG. 15. Brackets 170 may be pivots or hinges that allow accumulation table 102 (along with attached mover system 104 and washing system 106) to be pivoted into a vertical position relative to the frame, as shown in FIG. 15. In the compact position, apparatus 100 may be more easily transported and/or stored (e.g., stored in a smaller footprint space).

Figure 16:
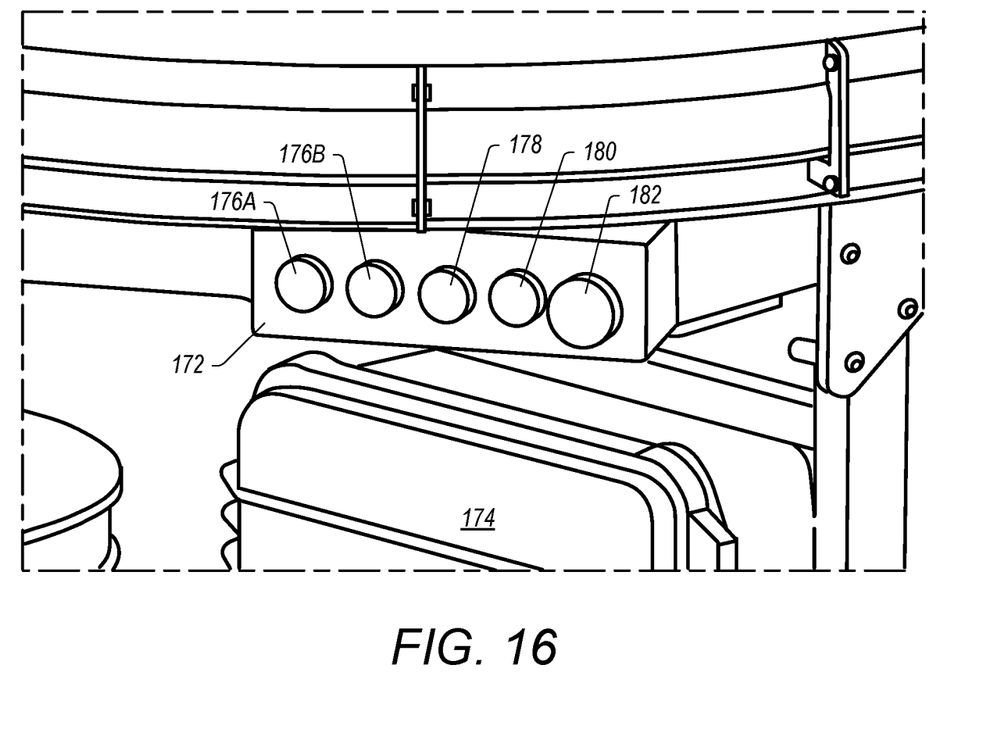
FIG. 16 depicts an enlarged view of an embodiment of a controller.

FIG. 16 depicts an enlarged view of an embodiment of controller 172. Controller 172 may be coupled to apparatus 100 and used to control one or more operations on the apparatus. In some embodiments, controller 172 is coupled to or powered by electrical cabinet 174. Electrical cabinet 174 may include, for example, power sources, switches, relays, and/or logic circuits for operation of apparatus 100. Controller 172 and/or electrical cabinet 174 may receive inputs from components on apparatus 100. For example, controller 172 and/or electrical cabinet 174 may receive input from sensors 122, 124, and/or 149, described above.

In certain embodiments, controller 172 includes one or more error lights 176. Error lights 176 may include, but not be limited to, actuator position error light 176A and holder position error light 176B, which may be triggered by sensor 122 and sensor 149, respectively. In certain embodiments, controller 172 includes pump button 178. Pump button 178 may be used to start or prime pump 140. Controller 172 may also include start button 180 and stop button 182, which may be used to start and stop, respectively, apparatus 100.

As described herein, apparatus 100 provides a simple and inexpensive apparatus for cleaning/washing cans or other containers. For example, as shown in the figures, apparatus 100 provides a simple, inexpensive, and efficient apparatus for feeding cans into a washing system, washing the cans in the washing system, and moving the cans out of the washing system. Apparatus 100 may also provide a high throughput, substantially continuous system for washing containers. Additionally, apparatus 100 provides an apparatus for washing containers that requires little to no manual operation. Thus, apparatus 100 may reduce manpower requirements for washing containers compared to manual methods.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. An apparatus for washing a plurality of beverage containers, comprising:
   an enclosure;
   a holder comprising at least one receptacle for a beverage container, wherein the holder is positioned in the enclosure, and wherein the holder is rotatable in the enclosure about an axis of rotation such that the at least one receptacle moves through a plurality of positions about the axis of rotation; and
   an injector coupled to the enclosure;
   wherein, in a first position about the axis of rotation, the at least one receptacle is positioned such that a beverage container enters and exits the at least one receptacle along a linear path, wherein the beverage container enters the at least one receptacle on a first side of the holder and exits the at least one receptacle on a second side of the holder, the second side of the holder being opposite the first side of the holder;
   wherein, in a second position about the axis of rotation, the at least one receptacle is aligned with the injector and the injector is configured to provide a fluid inside of the beverage container in the at least one receptacle; and
   wherein, in a third position about the axis of rotation, the at least one receptacle is positioned to drain the fluid from the beverage container in the at least one receptacle.

2. The apparatus of claim 1, wherein, in the first position about the axis of rotation, the beverage container is moved out of the at least one receptacle by at least one additional beverage container being moved into the at least one receptacle.

3. The apparatus of claim 1, further comprising a mover coupled to the enclosure, wherein the mover comprises an actuator configured to move the beverage container through the mover and into the at least one receptacle on the first side of the holder.

4. The apparatus of claim 1, wherein the third position about the axis of rotation is the same position about the axis of rotation as the second position about the axis of rotation.

5. The apparatus of claim 3, wherein the actuator comprises a star-shaped wheel that rotates about an axis.

6. The apparatus of claim 1, further comprising an accumulation table coupled to the enclosure, wherein the accumulation table is configured to support a plurality of beverage containers and move the beverage containers towards the holder.

7. The apparatus of claim 6, further comprising an oscillator coupled to the accumulation table, wherein the oscillator is arranged to guide beverage containers into a single row of beverage containers as the beverage containers move towards the holder.

8. The apparatus of claim 1, wherein the injector comprises a nozzle configured to direct fluids to an inside of the beverage container in the at least one receptacle.

9. The apparatus of claim 1, further comprising at least one additional receptacle in the holder, wherein the at least one additional receptacle is rotationally offset in the holder from the at least one receptacle, and wherein the at least one additional receptacle moves through the plurality of positions about the axis of rotation as the holder rotates about the axis of rotation.

10. The apparatus of claim 9, wherein the holder is arranged to simultaneously hold beverage containers in both the at least one receptacle and the at least one additional receptacle.

11. An apparatus for washing a plurality of beverage containers, comprising:
- an enclosure;
- a holder comprising at least one receptacle for a beverage container, wherein the holder is positioned in the enclosure, and wherein the holder is rotatable in the enclosure about an axis of rotation such that the at least one receptacle moves through a plurality of positions about the axis of rotation; and
- an injector coupled to the enclosure;
- wherein, in at least one of the plurality of positions about the axis of rotation, the at least one receptacle is positioned such that a beverage container enters and exits the at least one receptacle along a linear path, wherein the beverage container enters the at least one receptacle on a first side of the holder and exits the at least one receptacle on a second side of the holder, the second side of the holder being opposite the first side of the holder;
- wherein, in at least one of the plurality of positions about the axis of rotation, the at least one receptacle is aligned with the injector and the injector is configured to provide a fluid inside of the beverage container in the at least one receptacle; and
- wherein, in at least one of the plurality of positions about the axis of rotation, the at least one receptacle is positioned to drain the fluid from the beverage container.

12. The apparatus of claim 11, further comprising a mover coupled to the enclosure, wherein the mover comprises an actuator configured to move the beverage container through the mover and into the at least one receptacle on the first side of the holder.

13. The apparatus of claim 11, wherein the at least one receptacle is positioned to drain the fluid from the beverage container in a position about the axis of rotation that the at least one receptacle is aligned with the injector.

14. The apparatus of claim 11, further comprising an accumulation table coupled to the enclosure, wherein the accumulation table is configured to support a plurality of beverage containers and move the beverage containers towards the holder.

15. The apparatus of claim 11, wherein the injector comprises a nozzle configured to direct fluids to an inside of the beverage container in the at least one receptacle.

16. The apparatus of claim 11, further comprising at least one additional receptacle in the holder, wherein the at least one additional receptacle is rotationally offset in the holder from the at least one receptacle, and wherein the at least one additional receptacle moves through the plurality of positions about the axis of rotation as the holder rotates about the axis of rotation.

17. An apparatus for washing a plurality of beverage containers, comprising:
- an enclosure;
- a holder comprising at least one receptacle for a beverage container, wherein the holder is positioned in the enclosure, and wherein the holder and the at least one receptacle are rotatable in the enclosure about an axis of rotation; and
- an injector coupled to the enclosure;
- wherein the at least one receptacle is configured to receive a beverage container at a first position about the axis of rotation such that the beverage container enters and exits the at least one receptacle along a linear path at the first position, wherein the beverage container enters the at least one receptacle on a first side of the holder and exits the at least one receptacle on a second side of the holder, the second side of the holder being opposite the first side of the holder;
- wherein the at least one receptacle is configured to be rotated from the first position about the axis of rotation to be aligned with the injector, the injector being configured to provide a fluid inside of the beverage container when the at least one receptacle is aligned with the injector; and
- wherein the at least one receptacle is configured to be rotated from the first position about the axis of rotation to at least one additional position about the axis of rotation to drain the fluid from the beverage container.

18. The apparatus of claim 17, wherein the at least one additional position about the axis of rotation to drain the fluid from the beverage container is a position about the axis of rotation that the at least one receptacle is aligned with the injector.

19. The apparatus of claim 17, further comprising at least one additional receptacle in the holder, wherein the at least one additional receptacle is rotationally offset in the holder from the at least one receptacle, and wherein the at least one additional receptacle rotates about the axis of rotation along with the holder and the at least one receptacle.

20. The apparatus of claim 17, wherein the at least one receptacle is configured to such that the beverage container enters and exits the at least one receptacle by moving along the linear path through the at least one receptacle.

* * * * *